US007862217B2

(12) United States Patent
Suzuki et al.

(10) Patent No.: US 7,862,217 B2
(45) Date of Patent: Jan. 4, 2011

(54) VEHICLE LAMP UNIT AND VEHICLE HEADLAMP USING THE SAME

(75) Inventors: Yasufumi Suzuki, Isehara (JP); Yasuhiro Okubo, Isehara (JP)

(73) Assignee: Ichikoh Industries, Ltd., Tokyo (JP)

(*) Notice: Subject to any disclaimer, the term of this patent is extended or adjusted under 35 U.S.C. 154(b) by 39 days.

(21) Appl. No.: 11/375,583

(22) Filed: Mar. 15, 2006

(65) Prior Publication Data

US 2006/0215415 A1 Sep. 28, 2006

(30) Foreign Application Priority Data

Mar. 24, 2005 (JP) ............................ 2005-086365

(51) Int. Cl.
*B60Q 1/00* (2006.01)
*F21S 8/10* (2006.01)

(52) U.S. Cl. ...................................... 362/545; 362/538

(58) Field of Classification Search ................. 362/538, 362/545, 508, 519, 548, 543
See application file for complete search history.

(56) References Cited

U.S. PATENT DOCUMENTS

| | | | | |
|---|---|---|---|---|
| 4,851,968 | A * | 7/1989 | Nino | 362/539 |
| 6,953,274 | B2 * | 10/2005 | Rice | 362/526 |
| 7,059,755 | B2 * | 6/2006 | Yatsuda et al. | 362/545 |
| 2002/0006039 | A1 | 1/2002 | Ueda et al. | |
| 2003/0198060 | A1 * | 10/2003 | Ishida et al. | 362/516 |
| 2004/0120160 | A1 * | 6/2004 | Natsume | 362/544 |

FOREIGN PATENT DOCUMENTS

| | | | |
|---|---|---|---|
| EP | 1 357 332 | A2 | 10/2003 |
| EP | 1 526 328 | A2 | 4/2005 |
| JP | 64-086401 | A | 3/1989 |
| JP | 2003-031007 | A | 1/2003 |
| JP | 2003-317513 | A | 11/2003 |
| JP | 2005-129404 | A | 5/2005 |

* cited by examiner

*Primary Examiner*—Jason Moon Han
*Assistant Examiner*—Sean P Gramling
(74) *Attorney, Agent, or Firm*—Foley & Lardner LLP

(57) ABSTRACT

A vehicle lamp unit includes a reflective surface based on an ellipse; a semiconductor light source of which a light emitting portion is provided at a first focal point of the reflective surface or a vicinity of the first focal point; and a projection lens that projects a reflected light that is a light emitted from the semiconductor light source and reflected by the reflective surface to outside. An emission direction of a maximum light emission intensity from among light intensities of the semiconductor light source is inclined in a direction opposite to the projection lens with respect to an optical axis of the projection lens.

7 Claims, 6 Drawing Sheets

VEHICLE LAMP UNIT AND VEHICLE HEADLAMP USING THE SAME

CROSS-REFERENCE TO RELATED APPLICATIONS

The present document incorporates by reference the entire contents of Japanese priority document, 2005-086365 filed in Japan on Mar. 24, 2005.

BACKGROUND OF THE INVENTION

1. Field of the Invention

The present invention relates to a vehicle lamp unit employing a semiconductor light source, such as a light emitting diode-(LED) and an electroluminescent (EL or organic EL) device, and a vehicle headlamp using the vehicle lamp unit.

2. Description of the Related Art

There have been known vehicle lamp units of this type and vehicle headlamps using the vehicle lamp units. A conventional vehicle headlamp is disclosed in, for example, Japanese Patent Application Laid-Open No. 2003-317513. The conventional vehicle headlamp includes a reflective surface, a semiconductor light emitting element such as an LED as a light source, and a projection lens. When the semiconductor light emitting element is lit to emit light, the light emitted from the semiconductor light emitting element is reflected by the reflective surface. The light reflected by the reflective surface is emitted through a projection lens to the outside with a predetermined light distribution pattern and illuminates a road surface and the like.

Light emitting properties of an ordinary LED, for example, an ordinary Lambertian LED are explained below with reference to FIGS. 5 and 6. In FIGS. 5 and 6, reference letters H-H indicate a planar direction of a light emitting chip (light emitting portion 10) of an LED (semiconductor light source 6), and reference letters V-V indicate a vertical direction with respect to the planar direction H-H of the light emitting chip (light emitting portion 10) of the LED (semiconductor light source 6). The vertical direction V-V passes through an substantially center of the light emitting chip (light emitting portion 10) of the LED (semiconductor light source 6). As is clear from FIGS. 5 and 6, a relative intensity of the light emitted from the LED (semiconductor light source 6) is the maximum (100%) when angular displacement is 0 degree (vertical direction V-V). The relative intensity of the light emitted from the LED (semiconductor light source 6) gradually decreases as the angular displacement moves toward the planar direction H-H. For example, when the angular displacement is +70 degrees and −70 degrees, the relative intensity is about 20%. Furthermore, the relative intensity of the light emitted from the LED (semiconductor light source 6) is the minimum (0%) when the angular displacement is 100 degrees.

However, in the conventional vehicle headlamp, the planar direction of the light emitting chip of the LED being the semiconductor light emitting element is substantially parallel to an optical axis of the projection lens. In other words, the vertical direction (emission direction with the maximum light emission intensity) of the light emitting chip of the LED, being the semiconductor light emitting element, is substantially perpendicular to the optical axis. Therefore, in the conventional vehicle headlamp, most of lights emitted from the semiconductor light emitting element of which relative intensity is comparatively high are reflected downwardly with respect to the optical axis, by the reflective surface which is located above the semiconductor light emitting element. On the other hand, a small amount of lights, among the lights emitted from the semiconductor light emitting element, of which relative intensity is comparatively low, are reflected by the reflective surface in substantially parallel to the optical axis. As is clear from these, in the conventional vehicle headlamp, there is substantially no light, among the lights emitted through the projection lens, which is substantially parallel to the optical axis. Particularly, in the case of the vehicle headlamp which emits a light distribution pattern for oncoming traffic and a light distribution pattern for an expressway, both of which have cut-off lines, each light intensity (illumination, light amounts, etc.) along the cut-off lines of the light distribution patterns is low.

SUMMARY OF THE INVENTION

It is an object of the present-invention to at least solve the problems in the conventional technology.

A vehicle lamp unit according to one aspect of the present invention includes a reflective surface based on an ellipse; a semiconductor light source of which a light emitting portion is provided at a first focal point of the reflective surface or a vicinity of the first focal point; and a projection lens that projects a reflected light that is a light emitted from the semiconductor light source and reflected by the reflective surface to outside. An emission direction of a maximum light emission intensity from among light intensities of the semiconductor light source is inclined in a direction opposite to the projection lens with respect to an optical axis of the projection lens.

A vehicle headlamp according to another aspect of the present invention includes a lamp housing and a lamp lens that form a lamp room; and a plurality of vehicle lamp units. Each of the vehicle lamp units includes a reflective surface based on an ellipse; a semiconductor light source of which a light emitting portion is provided at a first focal point of the reflective surface or a vicinity of the first focal point; and a projection lens that projects a reflected light that is a light emitted from the semiconductor light source and reflected by the reflective surface to outside. An emission direction of a maximum light emission intensity from among light intensities of the semiconductor light source is inclined in a direction opposite to the projection lens with respect to an optical axis of the projection lens. The vehicle lamp units are arranged in the lamp room.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
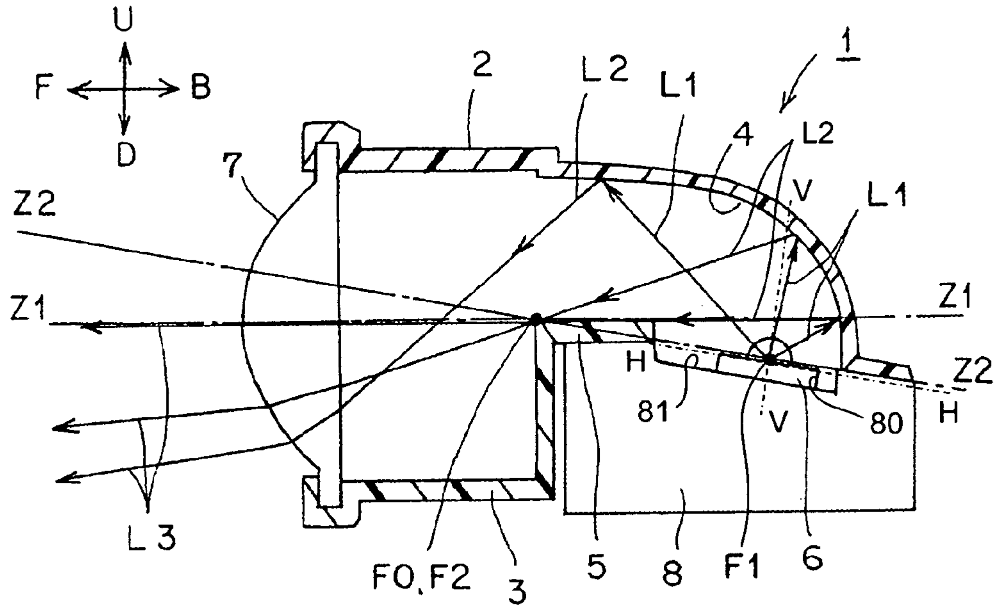
FIG. 1 is a vertical cross-section of an example of a vehicle lamp unit for a vehicle headlamp according to an embodiment of the present invention.

Exemplary embodiments of the present invention are explained in detail below with reference to the accompanying drawings. It should be noted that the present invention is not limited by these embodiments. In the drawings, reference letter "F" indicates the front side of a vehicle (forward direction of vehicle). Reference letter "B" indicates the rear side of the vehicle. Reference letter "U" indicates the upper side when viewed from the driver's seat. Reference letter "D" indicates the lower side when viewed from the driver's seat. Reference letter "L" indicates the left side when viewed from the driver's seat. Reference letter "R" indicates the right side when viewed from the driver's seat. Reference letters "VU-VD" indicate a vertical line between the top and bottom of a screen. Reference letters "HL-HR" indicate a horizontal line between the both sides of the screen.

FIG. 1 is a vertical cross-section of an example of a vehicle lamp unit 1 for a vehicle headlamp according to an embodiment of the present invention. In FIG. 1, reference numeral 1 indicates a vehicle lamp unit for a vehicle headlamp according to the present embodiment. As shown in FIG. 1, the vehicle lamp unit 1 is a projector type and has a unit structure. The vehicle lamp unit 1 includes an upper reflector 2 and a lower reflector 3, a reflective surface 4, a shade 5, a semiconductor light-source 6, and a projection lens (convex lens, condenser lens) 7.

Figure 3:
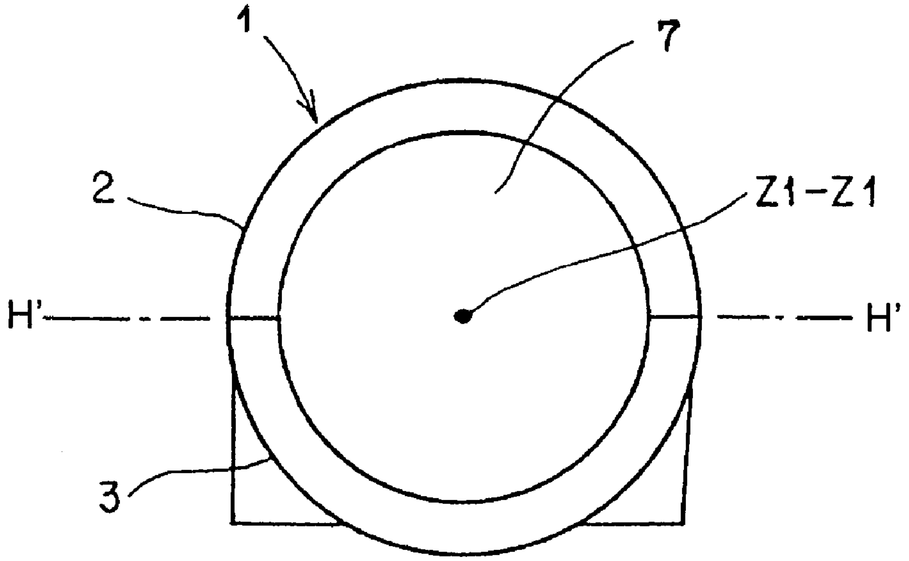
FIG. 3 is a front view of the vehicle lamp unit according to the present embodiment.

The upper reflector 2 and the lower reflector 3 are formed with an opaque resin material or the like, and are also used as a holding element such as a holder. The upper reflector 2 and the lower reflector 3 form a hollow shape as shown in FIG. 1, which is horizontally divided into two portions along a horizontal axis H'-H' as shown in FIG. 3. The upper reflector 2 and the lower reflector 3 are integrally fixed to each other by fixing means (not shown) (e.g., a bolt nut, a screw, caulking, clipping, bonding, and welding).

A front-side portion of the upper reflector 2 is opened semicircularly, and a portion from the front-side portion over a rear-side portion thereof through a central portion (upper-side portion) is closed. The inner surface of a closed portion, of the upper reflector 2, which is at least a portion from an substantially rear half portion of the central portion to the rear-side portion, is subjected to aluminum evaporation or silver coating to form the reflective surface 4.

The reflective surface 4 is formed with an elliptical reflective surface, for example, with a reflective surface such as a free-form surface based on a rotational elliptical surface or an ellipse. Consequently, as shown in FIG. 1, the reflective surface 4 has a first focal point F1, a second focal point F2, and an axis connecting between the first focal point F1 and the second focal point F2, i.e. a reflector axis Z2-Z2.

Figure 2:
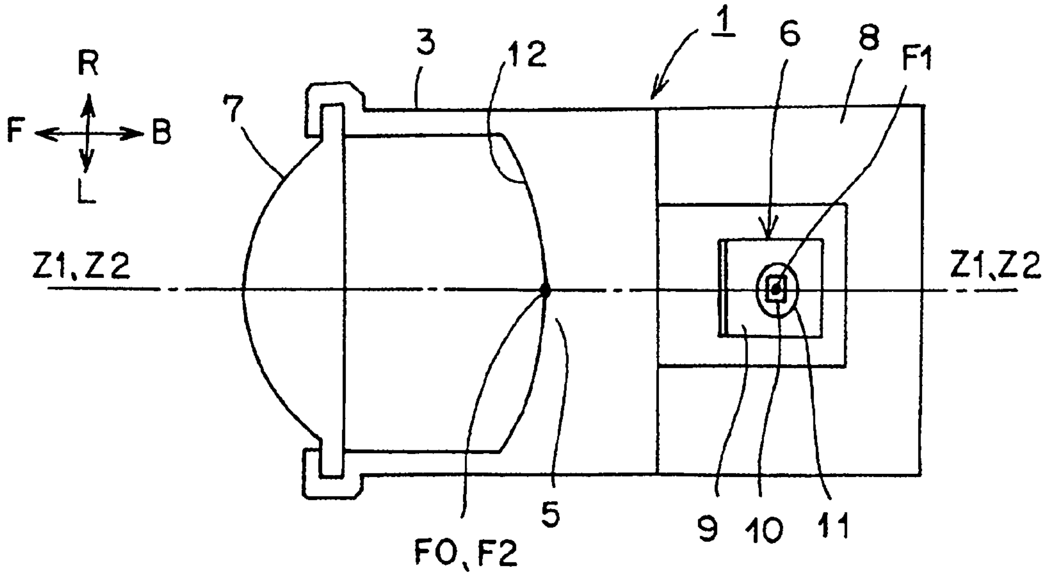
FIG. 2 is a plan view of a lower reflector, a semiconductor light source, and a projection lens when an upper reflector is removed according to the present embodiment.

FIG. 2 is a plan view of the lower reflector 3, the semiconductor light source 6, and the projection lens 7 when the upper reflector 2 is removed. As shown in FIGS. 1 and 2, a front-side portion of the lower reflector 3 is opened semicircularly, a portion from the front-side portion to an substantially front half portion of the central portion (lower-side portion) is closed, and a portion from an substantially rear half portion of the central portion to the rear-side portion is opened. A heat radiating element 8 is provided along an edge of a rear-side opening portion of the lower reflector 3.

A concave portion 80 is provided on the top surface of the heat radiating element 8. The semiconductor light source 6 is provided on a bottom face 81 of the concave portion 80. The face direction of the bottom face 81 is substantially parallel to the reflector axis Z2-Z2.

Figure 4:
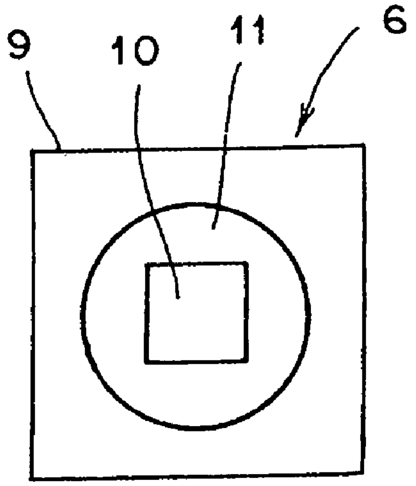
FIG. 4 is a plan view of the semiconductor light source according to the present embodiment.

The semiconductor light source 6 uses a light-emitting semiconductor light source such as an LED and an EL (organic EL) device. In the present embodiment, the semiconductor light source 6 uses an ordinary LED having the Light emitting properties shown in FIGS. 5 and 6, for example, an ordinary Lambertian LED. As shown in FIG. 4, the semiconductor light source 6 includes a substrate 9, a light emitting portion 10 being a light emitting element of a small rectangular (square-shaped) light source chip (semiconductor chip or light emitting chip) which is fixed to one surface of the substrate 9, and an optically-transparent element 11 that covers the light emitting portion 10.

The substrate 9 of the semiconductor light source 6 is fixed to the bottom face 81 of the concave portion 80 on the heat radiating element 8. Consequently, the semiconductor light source 6 is held by the upper reflector 2 and the lower reflector 3 through the heat radiating element 8. The light emitting portion 10 of the semiconductor light source 6 is located at the first focal point F1 of the reflective surface 4 or adjacent thereto. Further, the planar direction H-H of the light emitting portion 10 is substantially parallel to the reflector axis Z2-Z2. Furthermore, the emission direction V-V (vertical direction V-V of the light emitting portion 10) with the maximum light emission intensity among the intensities of lights emitted from the semiconductor light source 6 is substantially perpendicular to the reflector axis Z2-Z2.

The shade 5 is integrally provided in the central portion of the lower reflector 3. As shown in FIGS. 1 and 2, the shade 5 is formed with a horizontal plate, which is elongated in the left-right direction thereof. An edge 12 is formed at a corner between the shade 5 being the horizontal plate and a vertical plate along the left-right direction. The edge 12 forms a cut-off line CL of a light distribution pattern P (see FIG. 7). The edge 12 is located at the second focal point F2 of the reflective surface 4 or adjacent thereto. The reflective surface may also be formed in the inner surface of the lower reflector 3, for example, on the top surface of the horizontal plate of the shade 5.

The projection lens 7 is held by the edge of a front-side semicircular opening of the upper reflector 2 and by the edge of a front-side semicircular opening of the lower reflector 3. As shown in FIGS. 1 and 2, the projection lens 7 is a convex lens of an aspheric lens. The front side of the projection lens 7 has a convex aspheric surface, while the rear side thereof has a plano-aspheric surface. The projection lens 7 has a front-side focal point (not shown), a rear-side focal point F0, and an axis connecting between the front-side focal point and the rear-side focal point, i.e. an optical axis Z1-Z1.

As shown in FIGS. 1 and 2, the emission direction V-V with the maximum light emission intensity among the intensities of the lights emitted from the semiconductor light source 6 is inclined with respect to the optical axis Z1-Z1 of the projection lens 7 in the opposite direction to the projection lens 7, i.e. in the rearward direction. The reflective surface 4 is located above the semiconductor light source 6. The reflector axis Z2-Z2 of the reflective surface 4 intersects with the optical axis Z1-Z1 of the projection lens 7 at the rear-side focal point F0 on the optical axis Z1-Z1. Further, the semiconductor light source 6 and the first focal point F1 of the reflective surface 4 are provided on the opposite side to the reflective surface 4 i.e. the lower side with respect to the optical axis Z1-Z1 of the projection lens 7. Furthermore, the second focal point F2 of the reflective surface 4 is positioned at the rear-side focal point F0 of the projection lens 7 or adjacent thereto.

Figure 8:
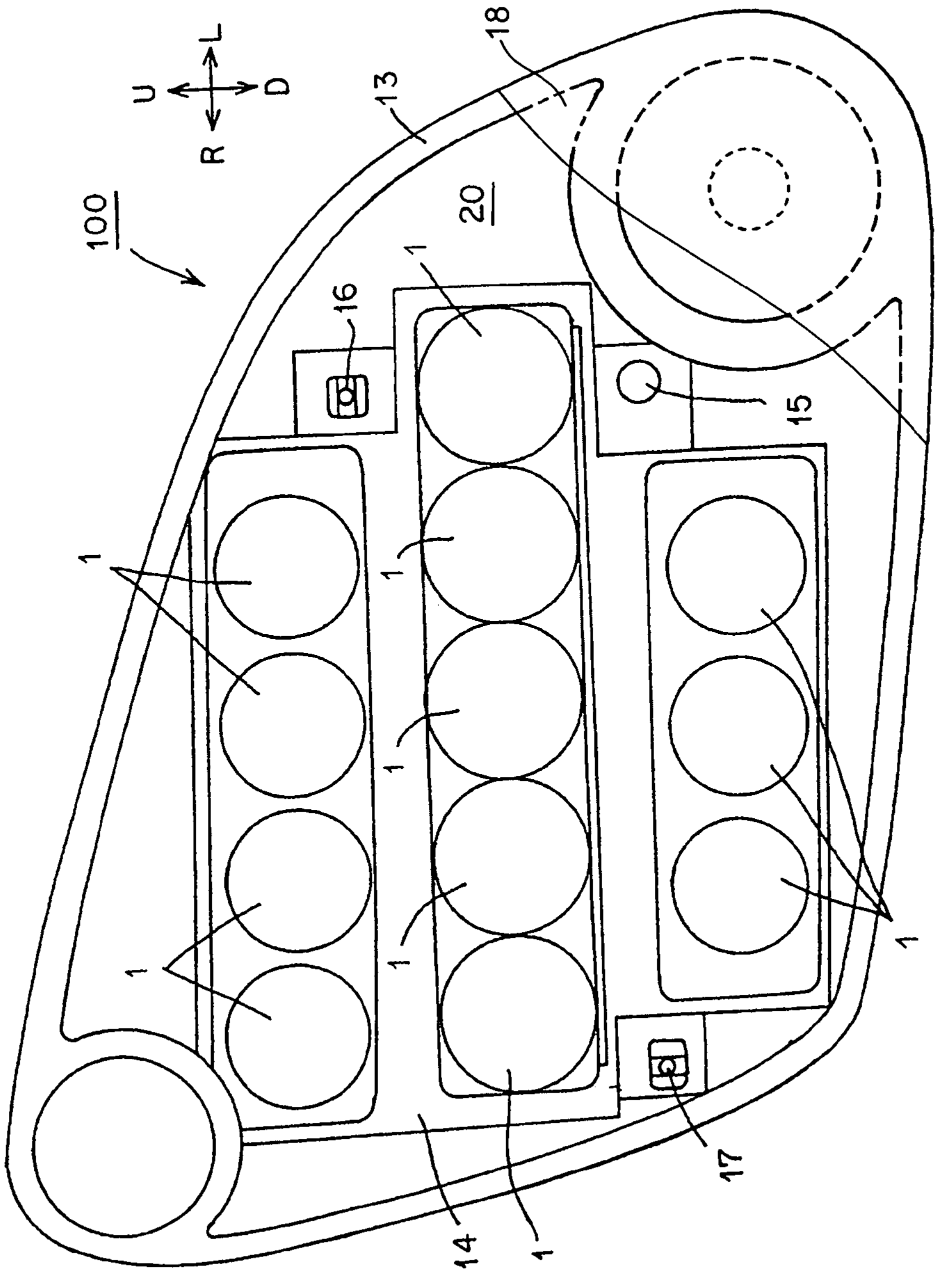
FIG. 8 is a diagram for explaining one example of a vehicle headlamp for the vehicle headlamp according to the present embodiment.

In FIG. 8, reference numeral 100 indicates a vehicle headlamp for the vehicle headlamp according to the present embodiment. The vehicle headlamp 100 uses a plurality of the vehicle lamp units 1, 12 pieces in this example. The vehicle headlamp 100 includes a lamp housing 13 and a lamp lens 18 (e.g., plain outer lens) which form a lamp room 20, 12 pieces of the vehicle lamp units 1 arranged in the lamp room 20, and an optical axis adjusting device.

The vehicle lamp units 1 are used, for example, in such a manner as four pieces arranged on an upper stage, five pieces on a middle stage, and three pieces on a lower stage of the lamp room 20. The 12 vehicle lamp units 1 are fixed to the lamp housing 13 so that each optical axis are adjustable, through the optical axis adjusting device shared by the vehicle lamp units 1. The optical axis adjusting device includes a fixing bracket 14, a pivot mechanism 15, an optical-axis vertically adjusting mechanism 16, and an optical-axis horizontally adjusting mechanism 17. In other words, the optical axis adjusting device shared thereby integrally adjusts respective optical axes Z1-Z1 of the 12 vehicle lamp units 1.

The vehicle lamp unit 1 and the vehicle headlamp 100 for the vehicle headlamp according to the present embodiment are configured in the above manner, and the functions thereof are explained below.

Figure 5:
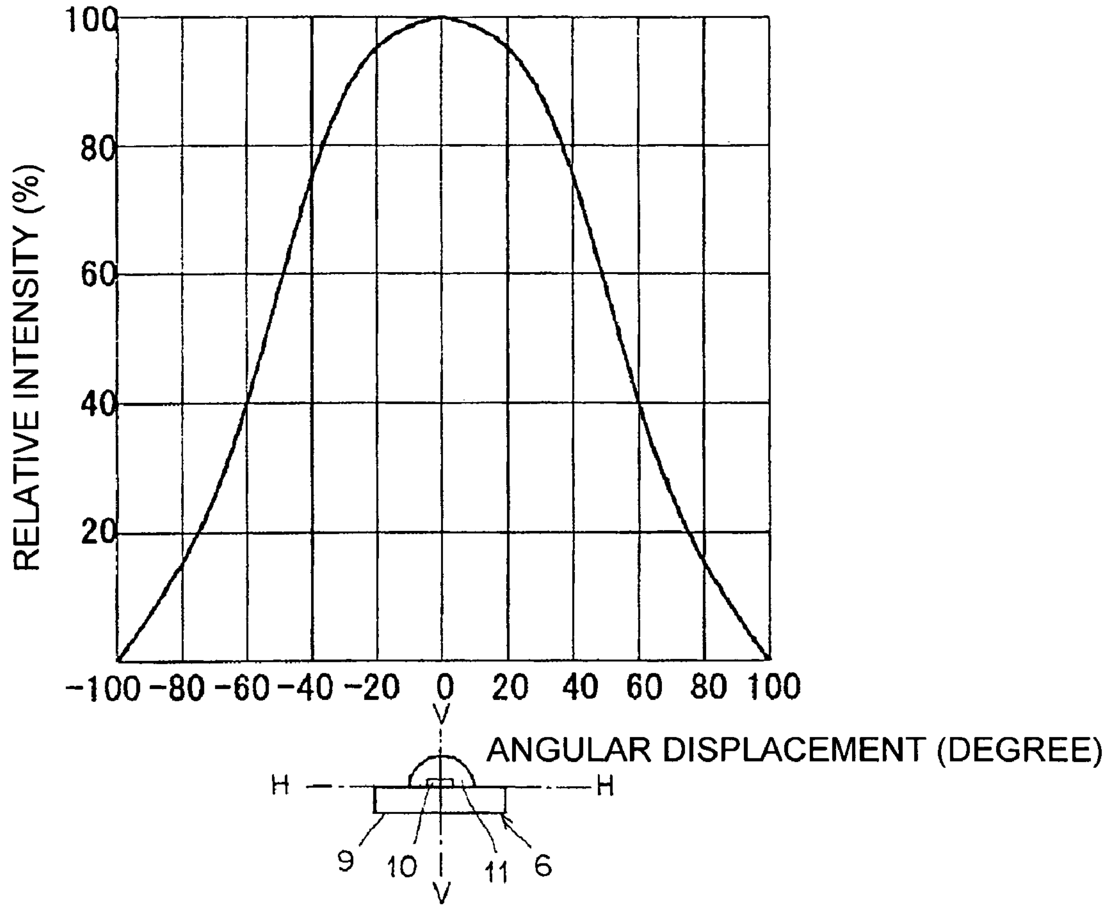
FIG. 5 is a diagram for explaining light emitting properties of the semiconductor light source by plotting relative intensity (%) on the Y-axis and angular displacement (degree) on the X-axis according to the present embodiment.
Figure 6:
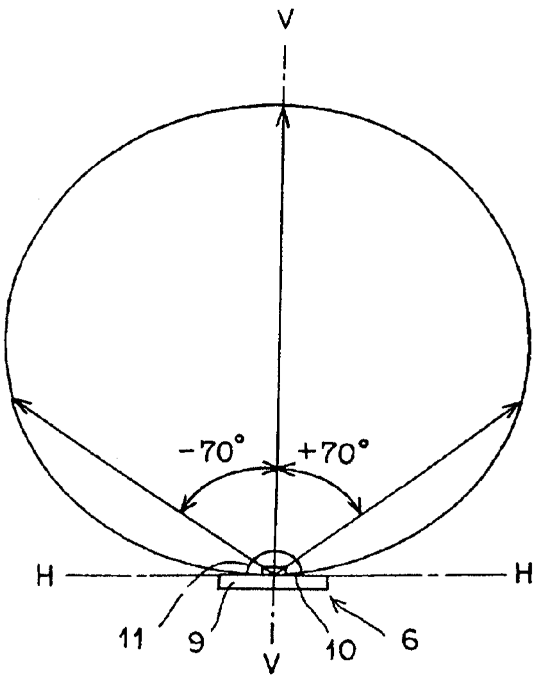
FIG. 6 is a diagram for explaining a range of emission intensities of 20% or more related to the light emitting properties of the semiconductor light source according to the present embodiment.

At first, the light emitting portion 10 of the semiconductor light source 6 in the vehicle lamp unit 1 is lit to emit light. Then, lights L1 having the light emitting properties as shown in FIGS. 5 and 6 are emitted from the light emitting portion 10 of the semiconductor light source 6. The lights L1 being most of the lights, which are emitted from the light emitting portion 10 and of which emission intensity is high, are reflected by the reflective surface 4 provided above the semiconductor light source 6. In FIGS. 5 and 6, the emission intensity in a range of +70 degrees and −70 degrees is about 20%, with respect to the vertical direction V-V in which the emission intensity is the maximum (100%). Substantially all of the lights L1 of which emission intensity is about 20% or more is reflected by the reflective surface 4.

Figure 7:
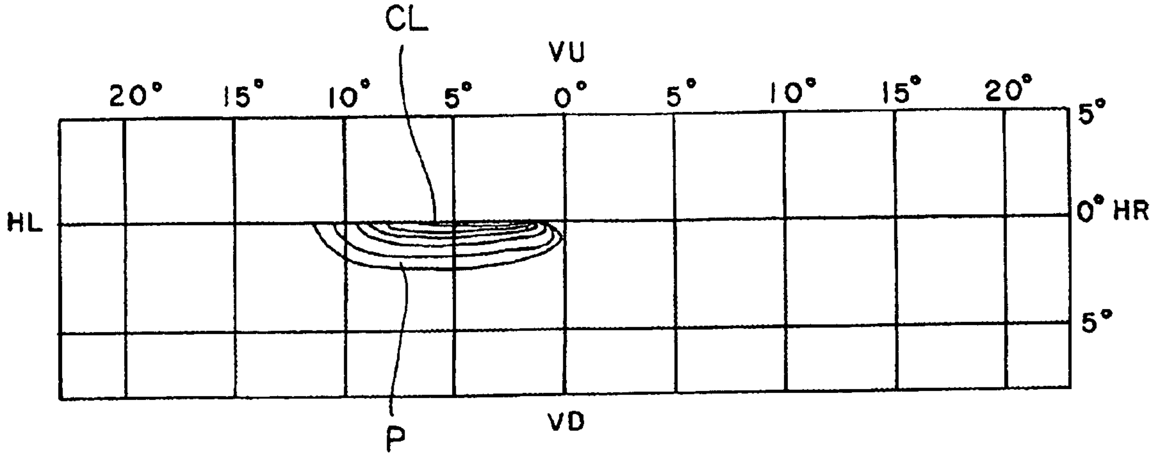
FIG. 7 is a diagram for explaining a light distribution pattern obtained by one vehicle lamp unit according to the present embodiment.

Then, reflected lights L2 reflected by the reflective surface 4 go to the second focal point F2 of the reflective surface 4. Here, part of the reflected lights L2 is blocked by the shade 5, and the reflected lights L2 not blocked by the shade 5 pass through the projection lens 7 and are projected to the outside as projected lights L3. FIG. 7 shows one example of the light distribution pattern P projected from one vehicle lamp unit 1 to the outside. As shown in FIG. 7, the cut-off line CL is formed along the upper edge of the light distribution pattern P, by the edge 12 of the shade 5.

Figure 9:
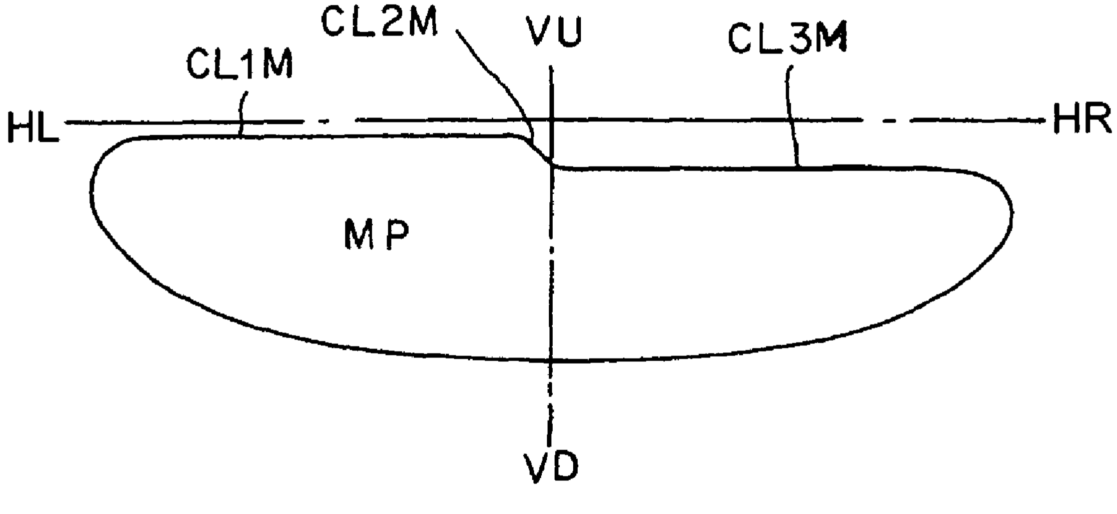
FIG. 9 is a diagram for explaining a light distribution pattern obtained by the vehicle headlamp using 12 vehicle lamp units.

When the vehicle headlamp 100 uses 12 vehicle lamp units 1, a light distribution pattern MP shown in FIG. 9 is obtained. The light distribution pattern MP has an upper horizontal cut-off line CL1M, a slanting cut-off line CL2M, and a lower horizontal cut-off line CL3M, which are formed along the upper edge thereof, respectively. Therefore, the light distribution pattern MP can illuminate a road etc. of the driving lane ahead either in a slightly longer or in a longer distance by the upper horizontal cut-off line CL1M, and can illuminate a road etc. of the oncoming lane ahead mainly in a shorter distance by the lower horizontal cut-off line CL3M. Thus, the light distribution pattern MP is suitable for a light distribution pattern for oncoming traffic and a light distribution pattern for expressways. The light distribution-pattern MP is also suitable for a swivel lamp unit that forms a light distribution pattern for a curved road.

The vehicle lamp unit 1 and the vehicle headlamp 100 for the vehicle headlamp according to the present embodiment have the configurations and the functions as explained above. The effects thereof are explained below.

In the vehicle lamp unit 1 for the vehicle headlamp according to the present embodiment, the semiconductor light source 6 is provided in a rearwardly inclined manner with respect to the optical axis Z1-Z1 of the projection lens 7. Therefore, as shown in FIG. 1, in the vehicle lamp unit 1 for the vehicle headlamp according to the present embodiment, lights, which are most of the lights L1 emitted from the light emitting portion 10 of the semiconductor light source 6 and of which relative intensity is comparatively high, are reflected by the reflective surface 4 in substantially parallel to the optical axis Z1-Z1 of the projection lens 7 and also downwardly with respect to the optical axis Z1-Z1 thereof. Therefore, in the vehicle headlamp according to the present embodiment, a large amount of the lights L3, which are substantially parallel to the optical axis Z1-Z1 of the projection lens 7, are emitted through the projection lens 7, to obtain the large amount of such lights L3 as explained above. Thus, the lights L3 are suitable for forming the light distribution patterns P and PM which illuminate the road or the like ahead in a comparatively longer distance.

Particularly, in the vehicle lamp unit 1 for the vehicle headlamp according to the present embodiment, the semiconductor light source 6 is arranged in the lower side with respect to the optical axis Z1-Z1 of the projection lens 7. Therefore, in the vehicle lamp unit 1 for the vehicle headlamp according to the present embodiment, the reflected lights L2 are emitted through the projection lens 7 as the projected lights L3 without being blocked by the semiconductor light source 6 when the lights, which are most of the lights L1 emitted from the semiconductor light source 6 and of which relative intensity is comparatively high, are reflected by the reflective surface 4 in substantially parallel to the optical axis Z1-Z1 of the projection lens 7 and also downwardly with respect to the optical axis Z1-Z1 thereof. Therefore, the vehicle headlamp according to the present embodiment can make effective use of substantially all of the lights L1 emitted from the semiconductor light source 6, which enables to obtain the bright light distribution patterns P and PM. This allows improvement of visibility and contribution to traffic safety.

In the vehicle lamp unit 1 for the vehicle headlamp according to the present embodiment, the shade 5 is provided at the second focal point F2 of the reflective surface 4 or adjacent thereto. As a result of this, in the vehicle headlamp according to the present embodiment, part of the reflected lights L2 from the reflective surface 4 is cut off and the remaining thereof is caused to proceed to the projection lens 7, and it is thereby possible to form the light distribution patterns P and PM having the cut-off lines CL, CL1M, CL2M, and CL3M (predetermined light distribution pattern such as the light distribution pattern for oncoming traffic and the light distribution pattern for expressways). Moreover, in the vehicle headlamp according to the present embodiment, a large amount of the lights L3 substantially parallel to the optical axis Z1-Z1 of the projection lens 7 are obtained, and hence, each light intensity (illumination, light amounts, etc.) near the cut-off lines CL, CL1M, CL2M, and CL3M increases, which allows improvement of visibility of the road or the like ahead in a longer distance and contribution to traffic safety.

Furthermore, the vehicle headlamp 100 for the vehicle headlamp according to the present embodiment can simultaneously and reliably adjust the respective optical axes Z1-Z1 of the vehicle lamp units 1.

The present embodiment is configured to provide the shade 5 at the second focal point F2 of the reflective surface 4 or adjacent thereto. The shade 5 cuts off part of the reflected lights L2 from the reflective surface 4 and forms the predetermined light distribution patterns P and PM with the remaining of the reflected lights L2. However, the present invention may be configured not to provide the shade 5 but to obtain a predetermined light distribution pattern without the cut-off lines along the upper edge thereof. In this case, the reflective surface may be provided on the lower reflector 3.

Moreover, the present embodiment is configured to divide a reflector into two portions, the upper reflector 2 and the lower reflector 3. However, the present invention may have an integral reflector or a reflector having three or more portions through division thereof.

Furthermore, the present embodiment is configured to use both the upper reflector 2 having the reflective surface 4 and the lower reflector 3 as the holding element. However, the present invention may be configured in such a manner that the reflector having the reflective surface is separately provided from the holding element.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle lamp unit comprising:

a reflective surface based on an ellipse, the reflective surface having a first focal point and a second focal point;

a semiconductor light source for the vehicle lamp unit of which a light emitting portion is provided at the first focal point of the reflective surface or a vicinity of the first focal point, the semiconductor light source having different light emission directions including a maximum emission direction having a maximum light emission intensity; and a projection lens that projects a reflected light that is a light emitted from the semiconductor light source and reflected by the reflective surface to outside, wherein the maximum emission direction is inclined in a direction opposite to the projection lens with respect to an optical axis of the projection lens, a light ray emitted directly from the semiconductor light source in the maximum emission direction crosses the optical axis of the projection lens at a distance from the first focal point of the reflective surface, and the light ray emitted directly from the semiconductor light source in the maximum emission direction crosses the optical axis of the projection lens at the distance from the first focal point of the reflective surface before the light ray is reflected by the reflective surface.

2. The vehicle lamp unit according to claim 1, wherein an axis connecting the first focal point and the second focal point of the reflective surface intersects with the optical axis of the projection lens at a rear-side focal point of the projection lens on the optical axis, and the semiconductor light source and the first focal point of the reflective surface are arranged on a side opposite to the reflective surface with respect to the optical axis of the projection lens.

3. The vehicle lamp unit according to claim 1, further comprising:

a shade provided at the second focal point of the reflective surface or a vicinity of the second focal point, the shade cutting off a part of the reflected light from the reflective surface and passing remaining of the reflected light to the projection lens to form a predetermined light distribution pattern.

4. The vehicle lamp unit according to claim 1, wherein the light emitting portion of the semiconductor light source is formed in a chip shape, a planar direction of the light emitting portion is substantially parallel to an axis connecting the first focal point and the second focal point of the reflective surface, and the emission direction of the maximum light emission intensity is substantially perpendicular to the planar direction of the light emitting portion.

5. The vehicle lamp unit according to claim 1, wherein an axis connecting the first focal point and the second focal point of the reflective surface is not parallel to the optical axis of the projection lens.

6. A vehicle headlamp comprising:

a lamp housing and a lamp lens that form a lamp room; and a plurality of vehicle lamp units each of which includes a reflective surface based on an ellipse, the reflective surface having a first focal point and a second focal point;

a semiconductor light source of which a light emitting portion is provided at the first focal point of the reflective surface or a vicinity of the first focal point, the semiconductor light source having different light emission directions including a maximum emission direction having a maximum light emission intensity; and a projection lens that projects a reflected light that is a light emitted from the semiconductor light source and reflected by the reflective surface to outside, wherein the maximum emission direction is inclined in a direction opposite to the projection lens with respect to an optical axis of the projection lens, a light ray emitted directly from the semiconductor light source in the maximum emission direction crosses the optical axis of the projection lens at a distance from the first focal point of the reflective surface, the vehicle lamp units are arranged in the lamp room, the light ray emitted directly from the semiconductor light source in the maximum emission direction crosses the optical axis of the projection lens at the distance from the first focal point of the reflective surface before the light ray is reflected by the reflective surface.

7. The vehicle headlamp according to claim 6, wherein the vehicle lamp units are fixed to the lamp housing in an optical-axis adjustable manner via a common optical-axis adjusting device that includes a fixing bracket, a pivot mechanism, an optical-axis vertical adjusting mechanism, and an optical-axis horizontal adjusting mechanism.

* * * * *